United States Patent
Kawabe (10) Patent No.: US 6,735,640 B1
(45) Date of Patent: May 11, 2004

(54) COMPUTER SYSTEM AND METHOD FOR OPERATING A COMPUTER UNIT AND A PERIPHERAL UNIT

(75) Inventor: Kiyoshi Kawabe, Ome (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 512 days.

(21) Appl. No.: 09/639,637

(22) Filed: Aug. 16, 2000

(51) Int. Cl.⁷ .................................................. G06F 3/00
(52) U.S. Cl. ........................ 710/14; 710/131; 712/229
(58) Field of Search ............................ 710/1, 8, 14, 15, 710/18, 19, 64, 29, 36, 131; 712/43, 229; 713/300, 330, 340, 323

(56) References Cited

U.S. PATENT DOCUMENTS

| | | | | |
|---|---|---|---|---|
| 5,390,027 A | * | 2/1995 | Henmi et al. | 358/335 |
| 5,805,139 A | * | 9/1998 | Uehara | 345/156 |
| 5,905,690 A | * | 5/1999 | Sakurai et al. | 365/233 |
| 5,974,559 A | * | 10/1999 | Bannai | 713/330 |
| 6,005,789 A | * | 12/1999 | Lee | 363/95 |
| 6,237,102 B1 | * | 5/2001 | Lee | 713/323 |
| 6,462,967 B1 | * | 10/2002 | Fujisawa et al. | 363/39 |

FOREIGN PATENT DOCUMENTS

JP   11-167479   6/1999

* cited by examiner

Primary Examiner—Jeffrey Gaffin
Assistant Examiner—Rijue Mai
(74) Attorney, Agent, or Firm—Finnegan, Henderson, Farabow, Garrett & Dunner, L.L.P.

(57) ABSTRACT

An integrated display personal computer in which a display unit such as a liquid-crystal panel and a PC unit are integrated into a single housing. The display unit can be used as a display for other notebook-sized personal computer or as that for a potable DVD player. The integrated display personal computer is provided with an input terminal and a signal selector for supplying either of a signal from the PC unit and a signal from the other device to the display unit selectively. Provided is a power distributor for supplying the electric power to the PC unit and the display unit selectively in response to the operation of the signal selector. When the signal from the PC unit is supplied to the display device, the power source power distributor supplies the electric power to both the PC unit and the display unit, while when the signal from the other device is supplied to the display device, the power distributor supplies the power to the display unit.

14 Claims, 6 Drawing Sheets

COMPUTER SYSTEM AND METHOD FOR OPERATING A COMPUTER UNIT AND A PERIPHERAL UNIT

BACKGROUND OF THE INVENTION

The present invention relates to a computer system whose peripheral unit such as a display, a CD-ROM drive, a hard disk drive, etc. can be operated independently from a main portion of the computer.

In recent years, as a novel configuration of the personal computer in the light of being space-saving, there is being developed the integrated display personal computer wherein a display unit comprising a liquid-crystal display panel and a computer unit (hereinafter referred to as a "PC unit" for abbreviation) are integrated into a single structural combination. Component parts of the PC unit are housed in a housing of the display unit. The integrated display personal computer of such a configuration has a merit that a display screen can be enlarged without being restricted by its installation location. Therefore, it is conceivable that this computer is used, for example, as a display for other notebook-sized personal computer or as a display for other device such as a portable DVD player.

However, the display unit of the conventional integrated display personal computer cannot be operated solely, which is different from the case of the normal desktop personal computer (comprising a PC unit and a display unit separately). Therefore in a way of use as mentioned above, that is, even in a case where the PC unit doesn't need to be operated, the entire personal computer including the PC unit needs to be operated, and consequently useless power consumption occurs.

This applies to not only the integrated display personal computer but also other general personal computer having peripheral units. For example, it is conceivable that a personal computer with a built-in peripheral unit having a function of reproducing a medium, such as a CD-ROM drive etc., is used as a media player rather than part of a computer. Or, a hard disk drive thereof is occasionally used as a storage device of other personal computer. Also in this case, these peripheral units cannot be operated solely, but can only be operated together with other useless parts, and hence electric power is consumed uselessly.

As described above, conventional personal computers are not be furnished with a function of making a peripheral unit thereof operate solely. Therefore, even when the peripheral unit is required to be operated only as a mere peripheral unit, not as part of the computer in operation, the whole computer needs to be operated and hence part of consumed electric power is being wasted.

BRIEF SUMMARY OF THE INVENTION

Accordingly, it is an object of the present invention to provide a computer system capable of making a peripheral unit thereof operate solely.

It is another object of the present invention to provide a computer system whose peripheral unit that is provided therein can be used as a peripheral unit of another device.

A computer system according to the present invention is provided with a power distributor for supplying the electric power to a computer unit and to a peripheral unit separately and when the peripheral unit thereof is operated, the computer unit is not supplied with the electric power or is set in a power-saving mode, so that useless power consumption can be avoided.

Another computer system according to the present invention is provided with a power distributor for supplying the electric power to a computer unit and to a peripheral unit separately, and further provided with a signal selector for connecting either of the computer unit or another computer to the peripheral unit, wherein, when the other computer is connected to the peripheral unit, the computer unit is not supplied with the electric power or is set in a power-saving mode, whereby the peripheral unit can be operated without consuming the extra electric power uselessly.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which.

DETAILED DESCRIPTION OF THE INVENTION

A preferred embodiment of a computer system according to the present invention will now be described with reference to the accompanying drawings.

First Embodiment

Figure 1:
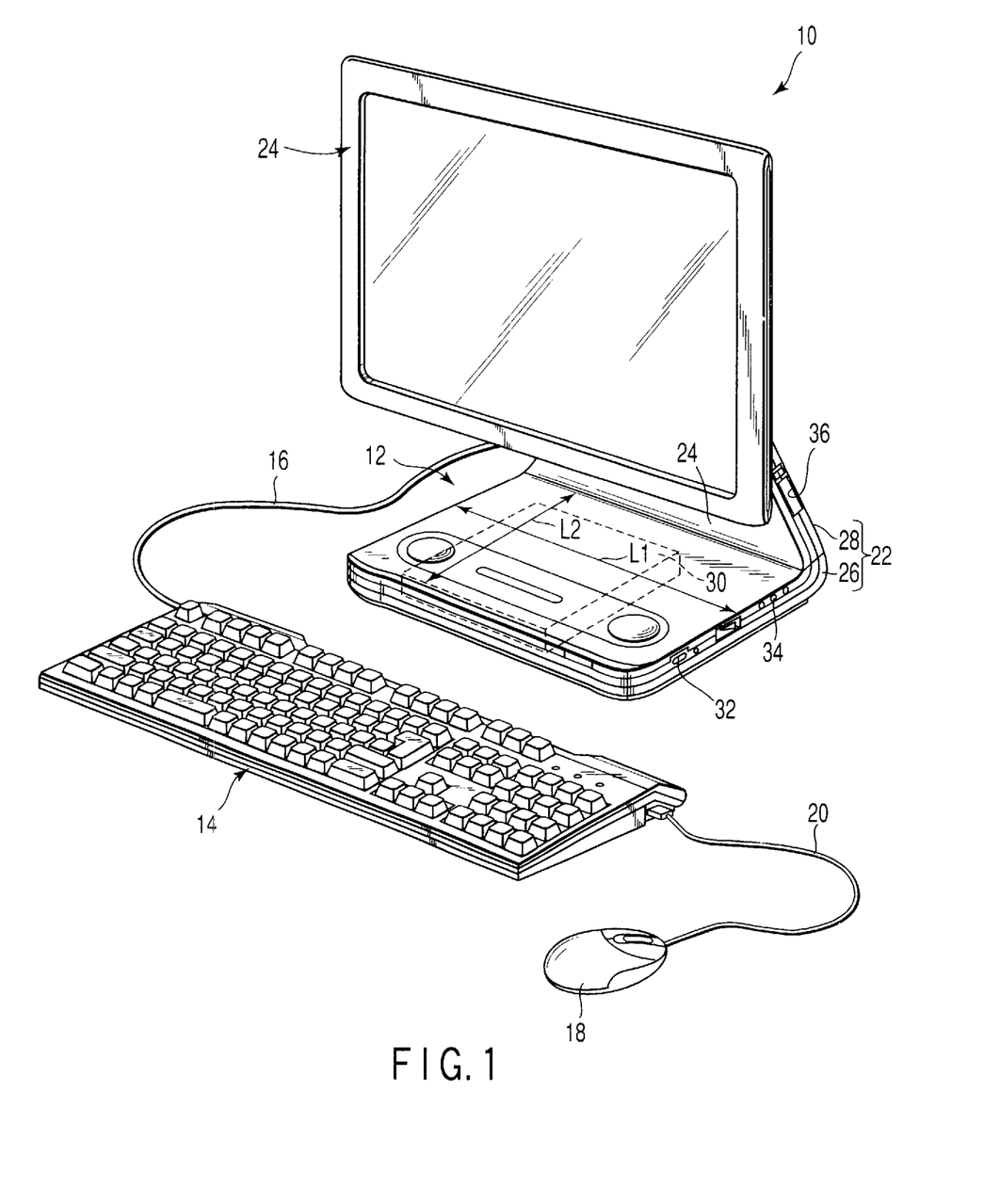
FIG. 1 is a perspective view showing a whole constitution of the integrated display personal computer as a first embodiment of the computer system according to the present invention.

FIG. 1 is a perspective view showing a whole constitution of the integrated display personal computer as the first embodiment according to the present invention.

The personal computer 10 comprises a main portion 12 and a keyboard 14. The keyboard 14 is connected to the main portion 12 through a cable 16, and a mouse 18 is connected to the keyboard 14 through a USB cable 20. Connection between the keyboard 14, the mouse 18, and the main portion 12 may be done by wireless connection such as the infrared ray communication etc. The main portion 12 comprises a housing 22 made of a synthetic resin and a liquid-crystal display unit 24 comprising a liquid-crystal display panel. The housing 22 comprises a flat and hollow base 26 of a box like shape having such dimensions of a width size L1 and a depth size L2 that allow a B5 size computer; and a stand 28 which is also hollow and extends upwardly from a rear end of an upper wall of the base 26.

The stand 28 has a comparable width size L1 to that of the base 26. The base 26 houses function parts such as a CD-ROM drive 30 etc. On the right side wall of the base 26, provided is a power switch 32 and an input/output terminal 34 such as an RGB (red, green, and blue) terminal 34 etc. On the right side wall of the stand 28, provided is a card slot 36 into which a PC card is to be installed.

Figure 2:
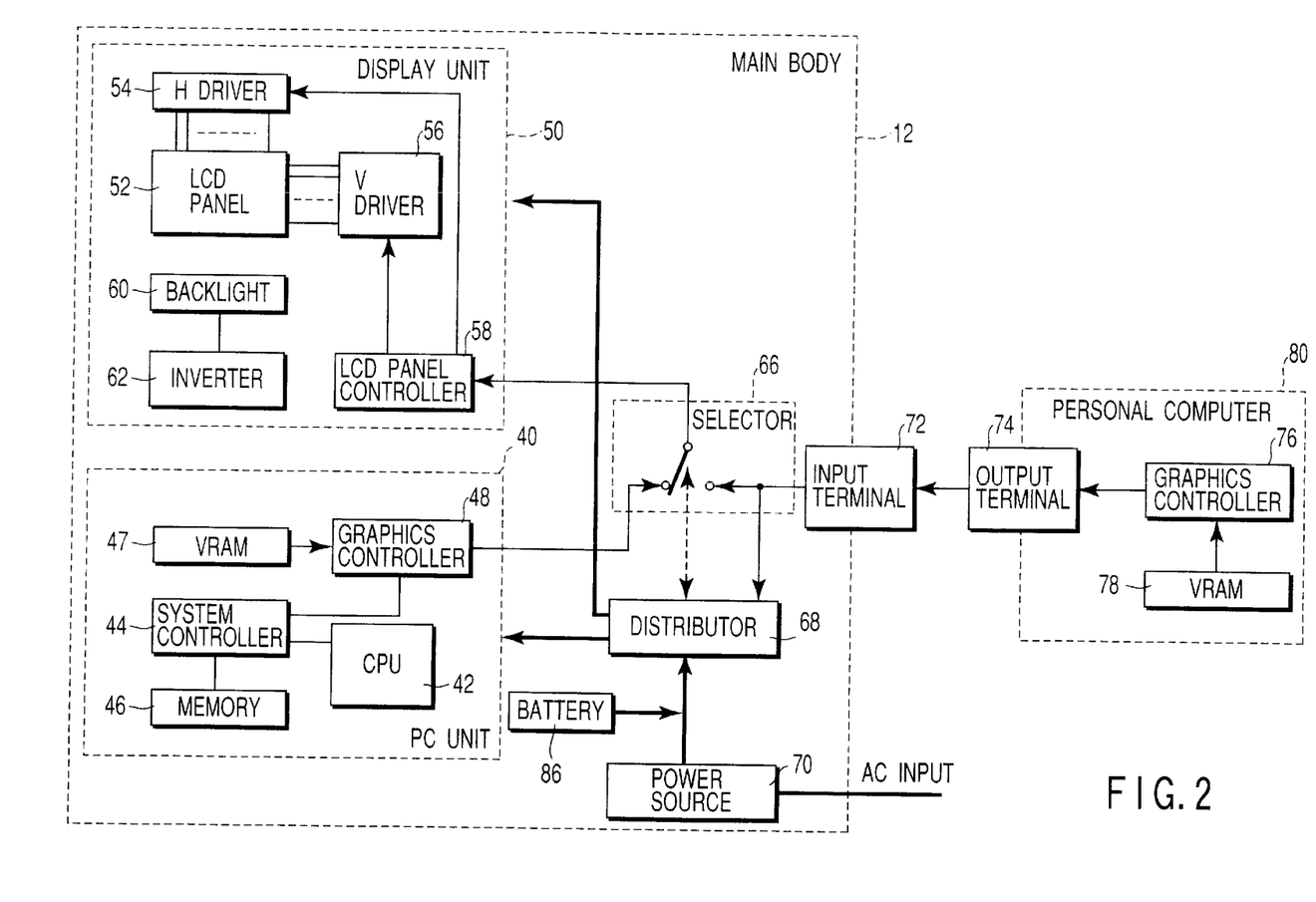
FIG. 2 is a block diagram showing a circuit configuration of the main portion of the first embodiment.

FIG. 2 is a block diagram showing the circuit configuration of then main portion 12. Here, the main portion 12 is divided roughly into a display unit 50 and a PC unit 40. The PC unit 40 comprises a CPU 42, system controller 44, memory 46, and video RAM (VRAM) 47, and graphics controller 48. The display unit 50 comprises an LCD (liquid-crystal display) panel 52, horizontal driver (H driver) 54, vertical driver (V driver) 56, LCD panel controller 58, back light 60, and inverter 62.

In the PC unit 40, display data processed by the CPU 42 are written into the VRAM 47, and the output of the VRAM 47 is outputted via the graphics controller 48. An output of the graphics controller 48 is supplied to a first input terminal of the signal selector 66. To a second input terminal of the signal selector 66, provided is an output of a VRAM 78 in another personal computer 80 (this being not necessarily limited to the desktop computer, and the notebook-sized computer also being able to be a candidate) via a graphics controller 76. To supply the signal from the other personal computer 80 to the computer main portion 12, an output terminal 74 of the other computer 80 is connected to an input terminal 72 of the computer main portion 12. The type of an input/output interface may be of an analog type or a digital type. If the display unit 50 has an external digital RGB (8×3) input, it is necessary to input the digital RGB (8×3) signal. Therefore, if the interface is a digital/analog RGB, it is desirable to connect a converter after the input terminal 72 for converting the input signal to a signal having a format suitable for the display unit 50. The signal selector 66 selects and outputs either of the first input signal or the second input signal. This selection may be performed manually or automatically. For the automatic selection, the signal sector 66 is normally switched to the first input terminal side, and outputs the signal from the PC unit 40. When the connection of the other personal computer 80 is detected, the signal selector 66 is switched to the second input terminal side and outputs the signal from the other personal computer 80 instead of the signal from the PC unit 40. The detection of the connection of the other personal computer 80 can be performed by detecting that a signal is inputted to the input terminal 72.

The output signal of the signal selector 66 is supplied to the LCD panel controller 58 of the display unit 50. Outputs of the panel controller 58 are supplied to the H driver 54 and the V driver 56, respectively, which drive the LCD panel 52. The inverter 62 receives DC power and supplies AC power to the back light 60.

The AC power supplied by the commercial power supply to the main portion 12 is inputted to a power source 70 and converted to the DC power. This DC power is supplied to the power distributor 68, which supplies the DC power to both the PC unit 40 and the display unit 50 or only to the display unit 50. It is possible to provide a battery 86 in addition to the AC input. The output of the battery 86 is supplied to the power distributor 68 as well as the DC output from the power source circuit 70. The power distributor 68 supplies the DC power to both the PC unit 40 and the display unit 50 in a first mode thereof; it supplies the DC power not to the PC unit 40 but only to the display unit 50 in a second mode thereof. The power distributor 68 operates in interlocking with the signal selector 66. That is, when the signal selector 66 is switched to the first input terminal side, the power distributor 68 is also set in the first mode. When the signal selector 66 is switched to the second input terminal side, the power distributor 68 is also set in the second mode. Because of this setting, the power distributor 68 also is normally set in the first mode where it supplies the DC power to both of the PC unit 40 and the display unit 50. When the connection of the other personal computer 80 is detected, it is switched to the second mode where it supplies the DC power not to the PC unit 40 but only to the display unit 50. As described above, the signal selector 66 may be operated manually or automatically, and the power distributor 68 also may be operated manually or automatically. In the above description, when the power distributor 68 is in the second mode, power supply to the PC unit 40 is halted. However, it may be allowed that the power distributor 68 is set in a power-saving mode where the power distribution is not completely blocked off.

Figure 3:
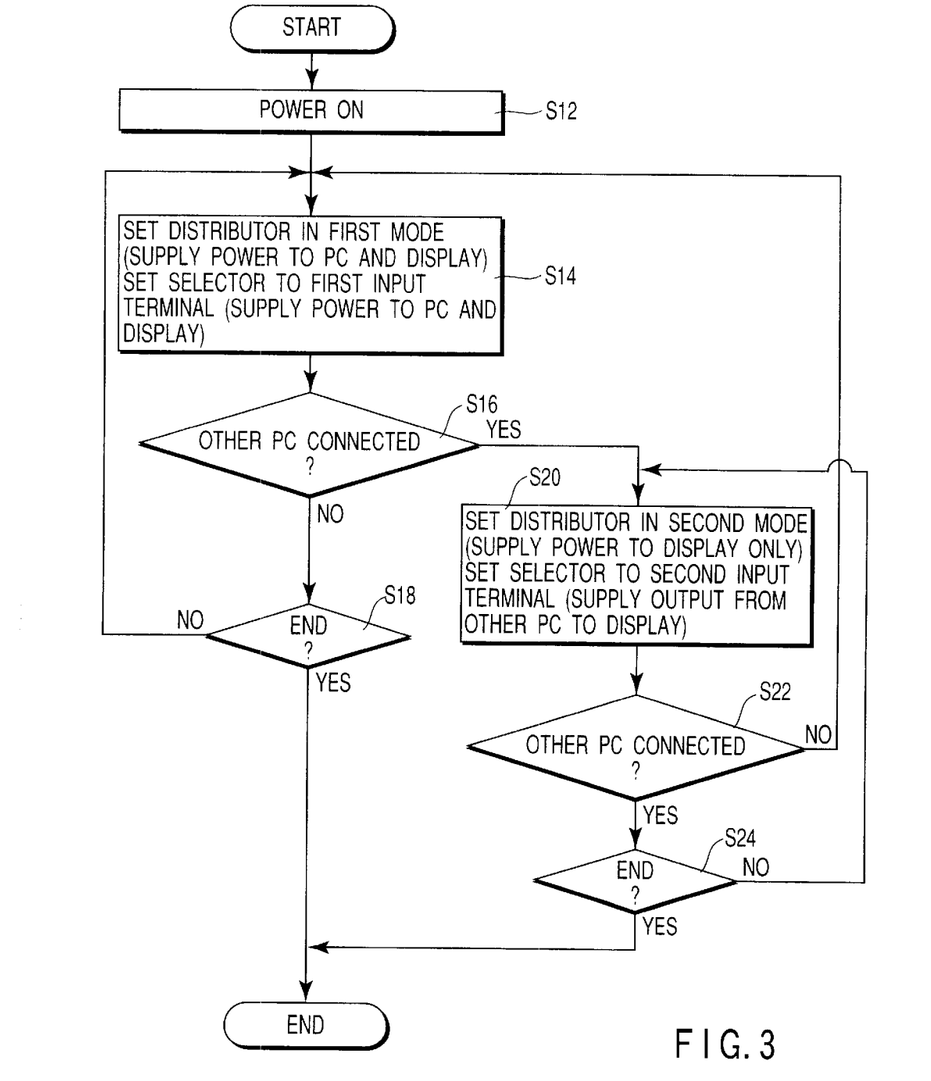
FIG. 3 is a flowchart showing the operation of the first embodiment.

Referring to FIG. 3, the operation of the present invention will be described. The AC power supply is turned on at step S12. Since the power distributor 68 is normally in the first mode, the electric power is supplied to the PC unit 40 and the display unit 50 at step S14. Since the selector 66 also is normally switched to the first input terminal side, the output of the PC unit 40 is supplied to the display unit 50 and displayed. At step S16, it is determined whether or not the other personal computer 80 is connected to the input terminal 72. If the other personal computer 80 is not connected, the condition of step S14 is maintained until power-off (e.g., turn off of a power switch of the main body 12) is detected at step S18.

When the connection of the other personal computer 80 is detected at step S16, the signal selector 66 is switched to the second input terminal side at step S20, so that the signal from the other personal computer 80 is supplied to the display unit 50 and is displayed, as well as the power distributor 68 is switched to the second mode where the power distributor 68 halts the power supply to the PC unit 40 and supplies the electric power only to the display unit 50. At step S22, it is determined whether or not the other personal computer 80 is still connected to the input terminal 72. When the other computer 80 is still connected, the condition of step S20 is maintained until the power-off of the main body 12 is detected at step S24.

As described above, according to the first embodiment, in the integrated display personal computer, provided is the power distributor 68 for supplying the electric power to the PC unit 40 and to the display unit 50 separately, and also provided is the signal selector 66 for supplying either of the signal from the PC unit 40 or the signal from the other computer 80 selectively to the display unit 50. When the signal from the other computer 80 is selected to the display unit 50, the PC unit 40 is not supplied with the electric power or is set in the power-saving mode, whereby only the display unit 50 can be operated as a display unit for the other device without consuming the extra electric power uselessly. It is conceivable that the other device to be connected to the input terminal 72 is not limited to the personal computer and any kind of devices having displays smaller than this display, for example, a portable DVD player etc. are allowed to be connected to the input terminal 72.

Other embodiments of the computer system according to the present invention will be described. The same portions as those of the first embodiment will be indicated in the same reference numerals and their detailed description will be omitted.

Second Embodiment

Figure 4:
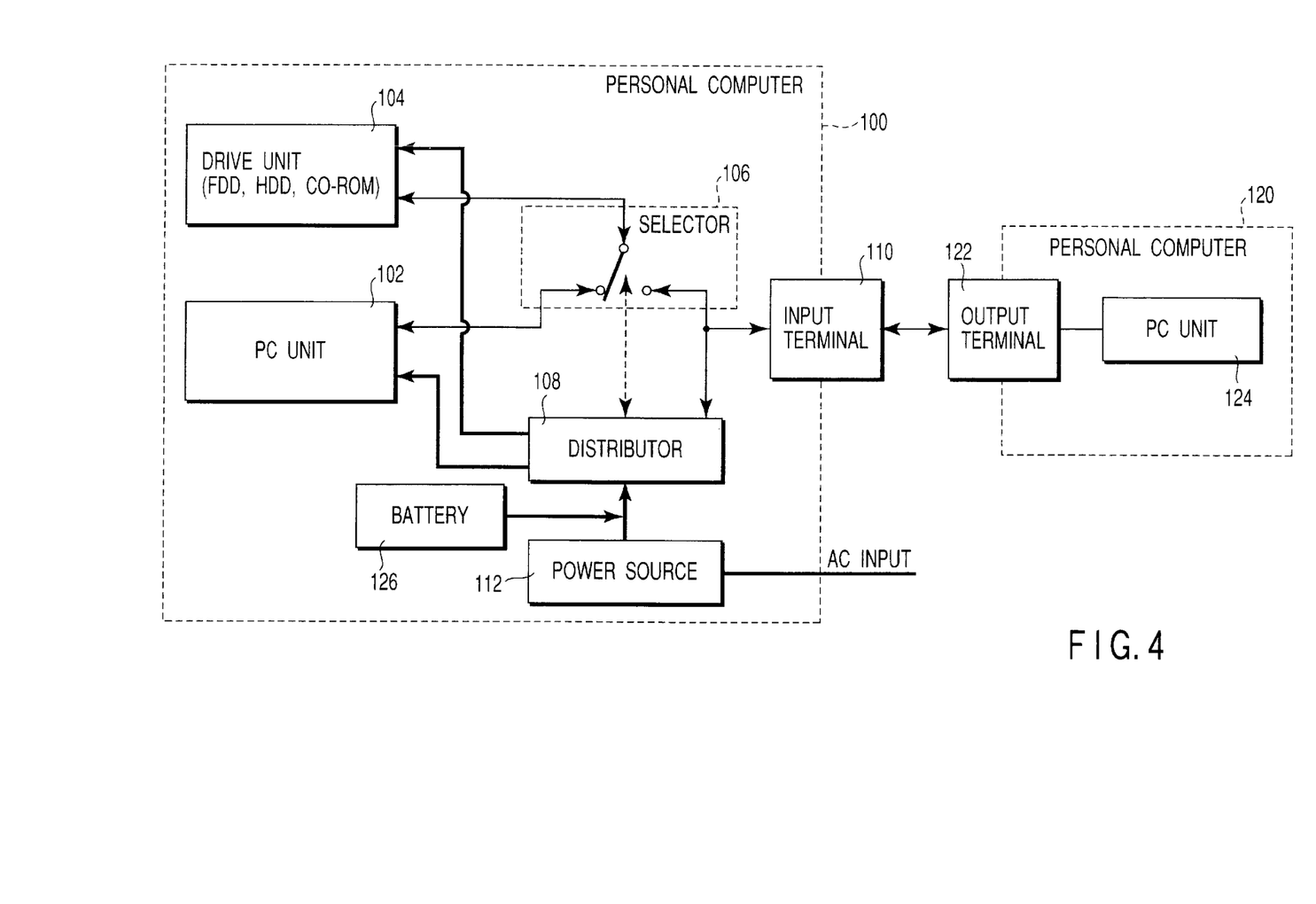
FIG. 4 is a block diagram showing a circuit configuration of the main portion of a second embodiment.

Next, the second embodiment pertaining to the general personal computer, not limited to the integrated display computer, will be described. Whereas in the first embodiment the peripheral unit that is intended to be operated solely is the display; the second embodiment is an example where the peripheral unit is a storage device. Therefore, a target computer may be the desktop computer or the notebook-sized computer, or additionally the integrated display computer. FIG. 4 is a block diagram showing a circuit configuration of a personal computer 100 of the second embodiment. The personal computer 100 is divided into two parts: one part being a PC unit 102 whose construction is the same as that of the PC unit 40 of the first embodiment; and the other part being a drive unit 104 such as a floppy disk drive, a hard disk drive, a CD-ROM drive, etc. as a peripheral unit. Here, a keyboard, a display, etc. are included in the PC unit 102.

A bus line of the PC unit 102 is connected to a first terminal of a signal selector 106. To a second terminal of the signal selector 106, connected is a bus line of a PC unit 124 inside another personal computer 120 (it is not limited only to the desktop computer but the notebook-sized computer also may be a candidate). For the supply of this signal, an input/output terminal 122 of the other computer 120 is connected to an input/output terminal 110 of this personal computer 100. The signal selector 106 selects and connects either of the first terminal or the second terminal to a movable terminal. The selection may be performed manually or automatically. In the case of the automatic selection, the signal selector 106 is normally switched to the first terminal side, selecting the PC unit 102, and when the connection of the other personal computer 120 is detected, the signal selector 106 is switched to the second terminal side, selecting the other personal computer 120 instead of the PC unit 102. The detection of the connection of the other personal computer 120 can be performed by detecting that a signal is inputted to the input/output terminal 110.

The movable terminal of the signal selector 106 is connected to the drive unit 104.

The AC power supplied from the commercial power supply to the personal computer 100 is inputted to a power source 112 and converted to the DC power. This DC power is supplied to the power distributor 108, which supplies the DC power to both of the PC unit 102 and the drive unit 104 or only to the drive unit 104. It is possible to provide a battery 126 in addition to the AC input. The output of the battery 126 is supplied to the power distributor 108 as well as the DC output from the power source circuit 112. The power distributor 108 supplies the DC power to both of the PC unit 102 and the drive unit 104 in a first mode thereof; it supplies the DC power not to the PC unit 102 but only to the drive unit 104 in a second mode thereof. The power distributor 108 operates in interlocking with the signal selector 106. That is, when the signal selector 106 is switched to the first terminal side, the power distributor 108 is also set in the first mode. When the signal selector 106 is switched to the second terminal side, the power distributor 108 is also set in the second mode. Because of this setting, the power distributor 108 also is normally set in the first mode where it supplies the DC power to both of the PC unit 102 and the drive unit 104. When the connection of the other personal computer 120 is detected, it is switched to the second mode where it supplies the DC power not to the PC unit 102 but only to the drive unit 104. As described above, the signal selector 106 may be operated manually or automatically. The power distributor 108 also may be operated manually or automatically. Further, in the above description, when the power distributor 108 is in the second mode, the power supply to the PC unit 102 is halted. However, it may be allowed that the power distributor 108 is set in a power-saving mode where the power distribution is not completely blocked off.

Figure 5:
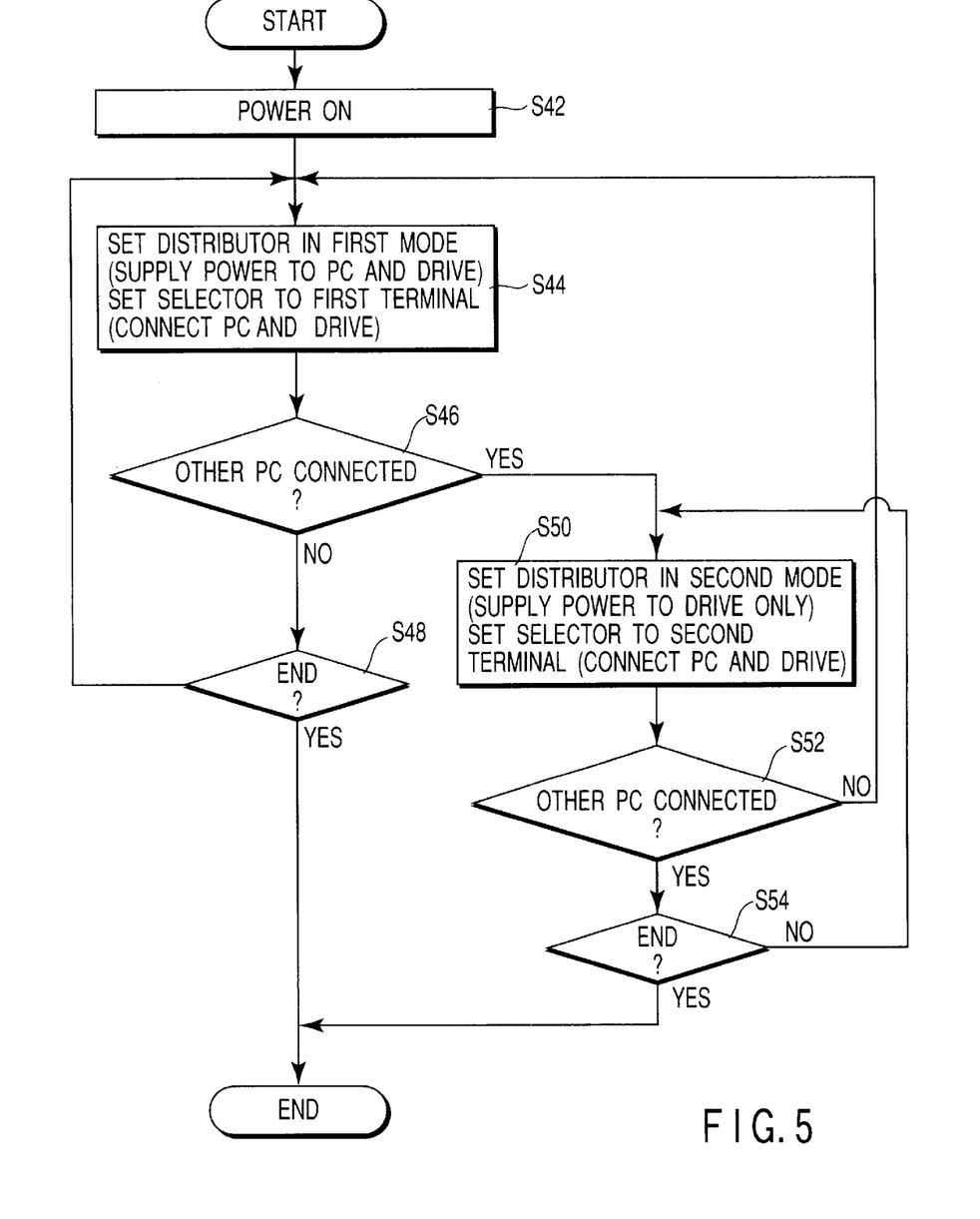
FIG. 5 is a flowchart showing the operation of the second embodiment.

Referring to FIG. 5, the operation of the second embodiment will be described. The AC power supply is turned on at step S42. Since the power distributor 108 is normally in the first mode, the electric power is supplied to the PC unit 102 and the drive unit 104 at step S44. Since the selector 106 also is normally switched to the first terminal side, the selector 106 connects the PC unit 102 to the drive unit 104 so that the PC unit 102 can access the drive unit 104. At step S46, it is determined whether or not the other personal computer 120 is connected to the input/output terminal 110. If the other personal computer 120 is not connected, the condition of step S44 is maintained until the power-off of the personal computer 100 is detected at step S48.

When the connection of the other personal computer 120 is detected at step S46, the power distributor 108 is switched to the second mode at step S50 where the power distributor 108 halts the power supply to the PC unit 102 and supplies the electric power only to the drive unit 104, as well as the selector 106 is switched to the second terminal side so that the other personal computer 120 is connected to the drive unit 104 and the other personal computer 120 can access the drive unit 104. At step S52, it is determined whether or not the other personal computer 120 is still connected to the input/output terminal 110. When the other personal computer 120 is still connected, the condition of step S50 is maintained until the power-off of the personal computer 100 is detected at step S54.

As described above, according to the second embodiment, provided is the power distributor 108 for supplying the electric power to the PC unit 102 and to the drive unit 104 separately, and also provided is the signal selector 106 for connecting either of the bus line of the PC unit 102 of the present computer 100 or the bus line of the PC unit 124 of the other computer 120 selectively to the drive unit 104. When the other computer 120 is connected to the drive unit 104, the PC unit 102 is not supplied with the electric power or is set in the power-saving mode, whereby only the drive unit 104 can be operated as a drive unit for the other device without consuming the extra electric power uselessly. In the case where the drive unit 104 is not operated as a drive unit for the other device but the drive unit 104 is either a CD-ROM drive or a DVD drive that can be used for its own purpose, it is conceivable that the drive unit is operated solely as a CD player or a DVD-audio player, not as a peripheral unit of the other device and the own device. In this case, the signal selector 106 is unnecessary and only the power distributor needs to be provided.

Figure 6:
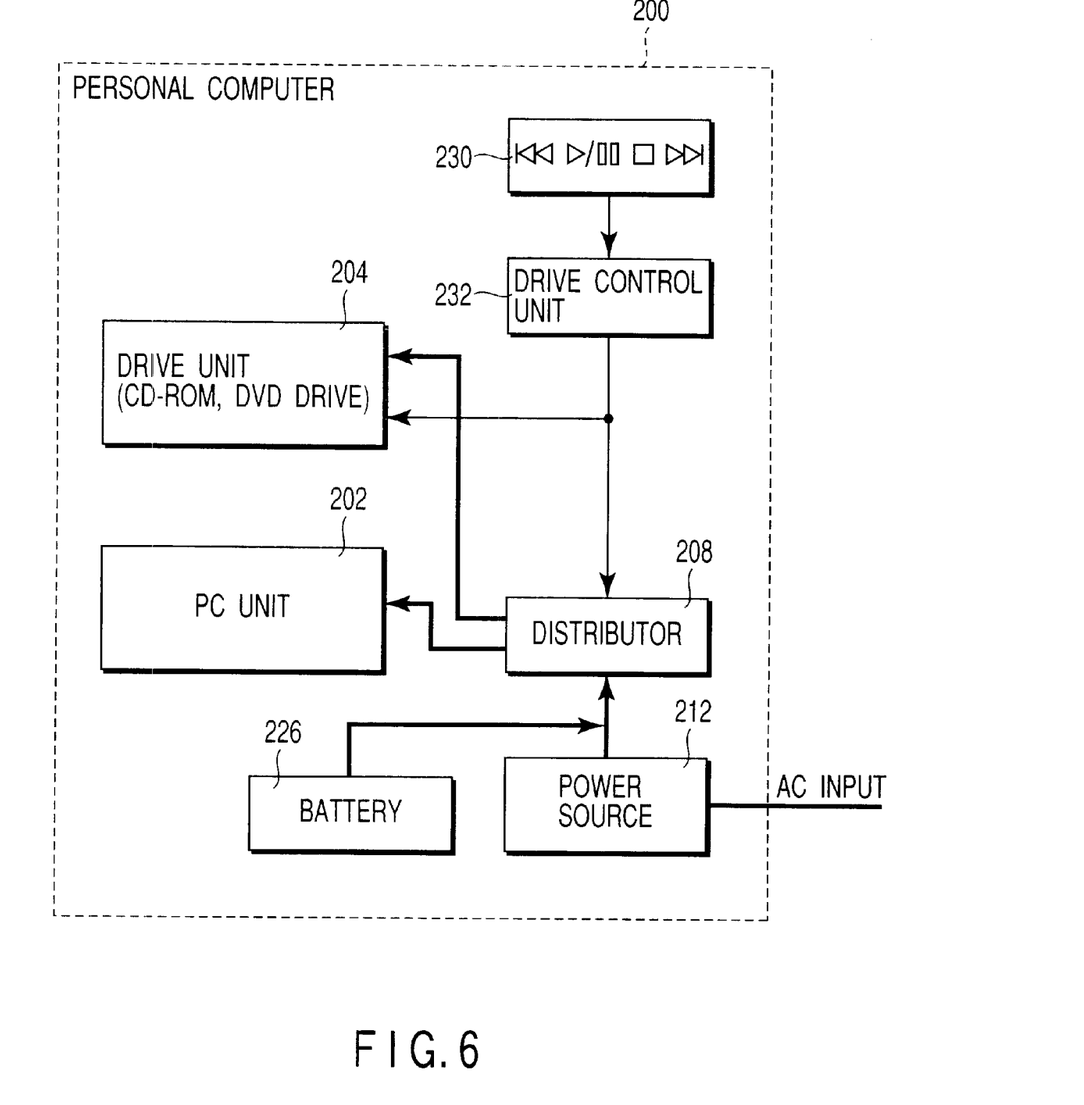
FIG. 6 is a block diagram showing a circuit configuration of a variation of the second embodiment.

FIG. 6 shows this modification. The personal computer 200 is divided into two parts: one part being a PC unit 202 whose construction is the same as that of the PC unit 40 of the first embodiment; and the other part being a drive unit 204 such as a CD-ROM drive, DVD drive, etc. as a peripheral unit. Though not shown, a sound board, speaker, etc. for reproducing sound are regarded as a part of the drive unit 204 with respect to power supply. The AC power supplied from the commercial power supply to the personal computer 200 is inputted to a power source 212 and converted to the DC power. This DC power is supplied to the power distributor 208, which supplies the DC power to both of the PC unit 202 and the drive unit 204 or only to the drive unit 204. It is possible to provide a battery 226 in addition to the AC input. The output of the battery 226 is supplied to the power distributor 208 as well as the DC output from the power source circuit 212. The power distributor 208 supplies the DC power to both of the PC unit 202 and the drive unit 204 in a first mode thereof; it supplies the DC power not to the PC unit 202 but only to the drive unit 204 in a second mode thereof. A user interface 230 including operation switches, such as reproduction, stop, etc., is connected to a drive control unit 232. When the drive control unit 232 detects an operation of the user interface 230 for instructing the operation of the drive unit 204, the drive control unit 232 supplies a selection signal to the power distributor 208. When the selection signal is supplied, the power distributor 208 is switched to the second mode where it supplies the DC power not to the PC unit 202 but only to the drive unit 204. The power distributor 208 may be operated manually. Further, in the above description, when the power distributor 208 is in the second mode, the power supply to the PC unit 202 is halted. However, it may be allowed that the power distributor 208 is set in a power-saving mode where the power distribution is not completely blocked off.

As described in the foregoing, according to the present invention, there can be provided the integrated display computer such that only a display thereof can be operated, or the computer such that only a peripheral unit thereof can be operated.

Additional advantages and modifications will readily occur to those skilled in the art. Therefore, the resent invention in its broader aspects is not limited to the specific details representative devices and illustrated examples shown and described herein. Accordingly various modifications may be made without departing from the spirit or scope of the general inventive concept as defined by the appended claims and their equivalents. For example, in the above-mentioned embodiments, the number of a peripheral unit that is intended to be operated solely is only one. However, a variant embodiment may be carried into practice where the display unit and the drive unit are operated solely in a selective manner by combining the first embodiment and the second embodiment together.

What is claimed is:

1. A computer system comprising:
    a computer unit having a central processing unit;
    a peripheral unit connected to the computer unit;
    a controller which operates the computer unit and the peripheral unit in a first mode and operates the peripheral unit in a second mode; and
    a selector which selects one of the first and second modes in accordance with detection of connection of another device, wherein the controller further includes a power supply which supplies power to the computer unit and the peripheral unit in the first mode and power to the peripheral unit in the second mode, and which further comprises a connector connected to another device and a connection unit which connects the computer unit and the peripheral unit in the first mode and connects the other device and the peripheral unit in the second mode.

2. The computer system according to claim 1, wherein the selector comprises a detector which detects connection of the another device to the connector and a mode setter which sets the second mode upon detection of the connection of the another device to the connector.

3. The computer system according to claim 1, wherein said peripheral unit is one of a hard disk drive, a floppy disk drive, a CD-ROM drive, and a display unit.

4. An integrated computer system comprising:
    a computer unit, a display unit connected to said computer unit via an interface, and a display connector connected to another computer system, and a housing including the computer unit and the display unit, the system comprising:
    a controller configured to supply a signal supplied from said other computer system to said display unit and power to said display unit when said other computer system is connected to said interface, wherein the controller further includes a power supply which supplies power to the computer unit and the display unit in the first mode and power to the display unit in the second mode, and which further comprises a connector connected to another computer system and a connection unit which connects the computer unit and the display unit in the first mode and connects other computer system and the display unit in the second mode.

5. The system according to claim 4, wherein connection of said other computer system is detected based on a presence of a signal from said other computer system at said display connector.

6. The system according to claim 4, wherein said controller is further configured to supply a signal supplied from said computer unit to said display unit and power to said computer unit and said display unit upon power-on of said integrated computer system.

7. The integrated computer system according to claim 4, wherein said display connector is an external RGB connector.

8. A method of operating a computer system comprising a computer unit having a central processing unit and a peripheral unit connected to said computer unit, the method comprising:
    selecting one of first and second modes in accordance with detection of connection of another device wherein the computer unit and the peripheral unit is operated in the first mode and the peripheral unit is operated in the second mode, which further comprises:
    supplying power to the computer unit and the peripheral unit in the first mode and power to the peripheral unit in the second mode; and
    connecting the computer unit and the peripheral unit in the first mode and connecting another device and the peripheral unit in the second mode.

9. The method according to claim 8, further comprising:
    in the second mode, supplying power to said computer unit when said other device is connected to said computer system.

10. The method according to claim 9, further comprising:
    supplying power to said computer unit and said peripheral unit, in the first mode upon power-on of said computer system.

11. The method according to claim 8, wherein said selecting comprises the following steps of:
    detecting connection of the other device;
    setting the second mode upon detection of the connection of the other device.

12. A method of operating an integrated computer system comprising a computer unit, a display unit connected to said computer unit via an interface, and a display connector connected to another computer system, and a housing including the computer unit and the display unit, the method comprising:

supplying a signal supplied from said other computer system to said display unit and power to said display unit when said other computer system is connected to said interface, which further comprises:
  supplying power to the computer unit and the display unit in the first mode and power to the display unit in the second mode; and
  connecting the computer unit and the display unit in the first mode and connecting another computer system and the display unit in the second mode.

13. The method according to claim 12, further comprising:

detecting connection of said another computer system based on a presence of a signal from said another computer system at said display connector.

14. The method according to claim 12, further comprising:

supplying a signal supplied from said computer unit to said display unit and power to said computer unit and said display unit upon power-on of said integrated computer system.

* * * * *

UNITED STATES PATENT AND TRADEMARK OFFICE
CERTIFICATE OF CORRECTION

PATENT NO. : 6,735,640 B1
DATED : May 11, 2004
INVENTOR(S) : Kawabe

It is certified that error appears in the above-identified patent and that said Letters Patent is hereby corrected as shown below:

Title page,
Item [57], ABSTRACT,
Line 5, change "potable" to -- portable --.

Signed and Sealed this

Thirteenth Day of July, 2004

JON W. DUDAS
*Acting Director of the United States Patent and Trademark Office*